United States Patent
Basso et al.

(10) Patent No.: US 12,010,409 B2
(45) Date of Patent: Jun. 11, 2024

(54) CAMERA VIEW PORT DEDICATED SELF CLEANING CYCLES

(71) Applicant: WHIRLPOOL CORPORATION, Benton Harbor, MI (US)

(72) Inventors: Margherita Basso, Varese (IT); Luca Distaso, Gemonio (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 0 days.

(21) Appl. No.: 17/559,008

(22) Filed: Dec. 22, 2021

(65) Prior Publication Data

US 2023/0199287 A1    Jun. 22, 2023

(51) Int. Cl.
*H04N 23/52* (2023.01)
*F24C 14/02* (2006.01)
*G06V 10/74* (2022.01)
*G06V 20/52* (2022.01)
*H04N 7/18* (2006.01)
*H04N 23/50* (2023.01)

(52) U.S. Cl.
CPC ............. *H04N 23/52* (2023.01); *F24C 14/02* (2013.01); *G06V 10/74* (2022.01); *G06V 20/52* (2022.01); *H04N 7/183* (2013.01); *H04N 23/555* (2023.01)

(58) Field of Classification Search
CPC ...... H04N 23/52; H04N 7/183; H04N 23/555; F24C 14/02; G06V 10/74; G06V 20/52
See application file for complete search history.

(56) References Cited

U.S. PATENT DOCUMENTS

| | | | |
|---|---|---|---|
| 5,343,020 A * | 8/1994 | Waigand | F24C 14/02 219/412 |
| 10,523,851 B2 | 12/2019 | Armstrong | |
| 11,547,240 B2 * | 1/2023 | Eiter | F27D 21/02 |
| 2002/0079306 A1 * | 6/2002 | Gros | F24C 14/02 219/397 |
| 2002/0096510 A1 * | 7/2002 | Metcalfe | F24C 14/02 219/492 |
| 2018/0242410 A1 | 8/2018 | Imai et al. | |
| 2019/0128611 A1 * | 5/2019 | Abdoo | F24C 15/008 |
| 2020/0166276 A1 * | 5/2020 | Garuccio | F24C 7/085 |

(Continued)

FOREIGN PATENT DOCUMENTS

| | | | |
|---|---|---|---|
| DE | 102012011046 A1 | 12/2013 | |
| DE | 102017220884 A1 | 5/2019 | |

(Continued)

OTHER PUBLICATIONS

Parsons, Dirty Camera Detection—June, The June Oven, Mar. 20, 2020, retrieved from https://support.juneoven.com/hc/en-us/articles/360044840194 on Aug. 23, 2021.

*Primary Examiner* — Michael Lee
(74) *Attorney, Agent, or Firm* — Brooks Kushman P.C.

(57) ABSTRACT

A dedicated self-cleaning cycle for a camera for imaging a cavity of an oven is provided. An indication is received to perform a localized pyrolytic cycle to clean a view port glass protecting an image sensor of the camera from heat or detritus in the cavity of the oven. Responsive to the indication, a camera viewport heating element configured to provide localized heating to the view port glass is operated to perform the localized pyrolytic cycle. The camera is utilized to view the cavity of the oven.

20 Claims, 4 Drawing Sheets

(56) References Cited

U.S. PATENT DOCUMENTS

| | | | |
|---|---|---|---|
| 2020/0198587 A1* | 6/2020 | Du | B60S 1/485 |
| 2020/0217513 A1* | 7/2020 | Clayton | G06V 40/20 |
| 2021/0222887 A1* | 7/2021 | Moore | F24C 15/36 |
| 2021/0285653 A1 | 9/2021 | Bhogal et al. | |
| 2021/0341152 A1* | 11/2021 | Johnson | F24C 7/085 |

FOREIGN PATENT DOCUMENTS

| | | | | |
|---|---|---|---|---|
| DE | 102020126930 A1 * | 4/2022 | | F24C 7/085 |
| EP | 3862634 A1 | 8/2021 | | |
| EP | 3872403 A1 | 9/2021 | | |

* cited by examiner

CAMERA VIEW PORT DEDICATED SELF CLEANING CYCLES

TECHNICAL FIELD

Disclosed herein are approaches to performing camera view port dedicated self-cleaning cycles.

BACKGROUND

Ovens are kitchen appliances that are used to cook food. During the cooking process, the interior of the oven, where the food is cooked, may become soiled. For example, food may spill out of a baking pan or splatter during the cooking process. Due to the heat used for cooking, food particles may become baked onto the walls inside the oven. As a result, surfaces inside the oven may be difficult to clean by hand.

Many ovens have a self-cleaning feature. During self-cleaning, the oven interior is subjected to high temperatures. In some ovens, high temperatures are used to provide pyrolytic cleaning (e.g., an approach in which an oven temperature of 420~500 degrees Celsius is used), in which food particles are reduced to ash that collects on the bottom of the oven. The ash can be easily removed after the self-cleaning function has finished.

SUMMARY

In one or more illustrative examples, a method for a dedicated self-cleaning cycle for a camera for imaging a cavity of an oven is provided. An indication is received to perform a localized pyrolytic cycle to clean a view port glass protecting an image sensor of the camera from heat or detritus in the cavity of the oven. Responsive to the indication, a camera viewport heating element configured to provide localized heating to the view port glass is operated to perform the localized pyrolytic cycle. The camera is utilized to view the cavity of the oven.

In one or more illustrative examples, a system for performing a dedicated self-cleaning cycle for a camera configured to image a cavity of an oven is provided. A camera includes an image sensor and a view port glass configured to protect the image sensor of the camera from heat or detritus in the cavity of the oven. A camera viewport heating element is configured to provide localized heating to the view port glass of the camera. A controller is programmed to receive an indication to perform a localized pyrolytic cycle to clean the view port glass, responsive to the indication, operate the camera viewport heating element to perform the localized pyrolytic cycle, and utilize the camera to view the cavity of the oven.

In one or more illustrative examples, a non-transitory computer-readable medium includes instructions for performing a dedicated self-cleaning cycle for a camera configured to image a cavity of an oven that, when executed by a controller, cause the controller to perform operations including to receive an indication to perform a localized pyrolytic cycle to clean a view port glass protecting an image sensor of the camera from heat or detritus in the cavity of the oven; responsive to the indication, operate a camera viewport heating element configured to provide localized heating to the view port glass to perform the localized pyrolytic cycle; and utilize the camera to view the cavity of the oven.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

An oven may include a camera for observing the contents of the oven cavity. For example, the camera may be used to show images of the contents of the oven to a user. Or, the camera may be used to capture images that are analyzed to determine the done less level of food in the oven. A viewport glass may be integrated into the oven cavity in front of the camera. This view port glass may be designed to protect the lens of the camera during cooking cycles. The view port glass may function to both prevent dirt and cooking fat from depositing on the lens of the camera and also to protect the overall camera module from heat. However, after multiple cooking cycles the view port glass collects dirt and fat of the cooked food and may require cleaning to ensure the visibility from the camera. If the camera is obscured, then the operation of functions that require images from the camera may be compromised.

To ensure the camera has a clear view through the view port, a heating element may be installed proximate to the view port glass. The oven may utilize the view port heating element to generate a pyrolytic cycle to clean the view port glass. As the view port heating element may be localized to the view port glass, a quick dedicated pyrolytic cycle may be performed without having to engage the slow and energy-intensive main heating elements of the oven used to perform a full oven pyrolytic cycle. Further aspects of the disclosure are discussed in detail herein.

Figure 1:
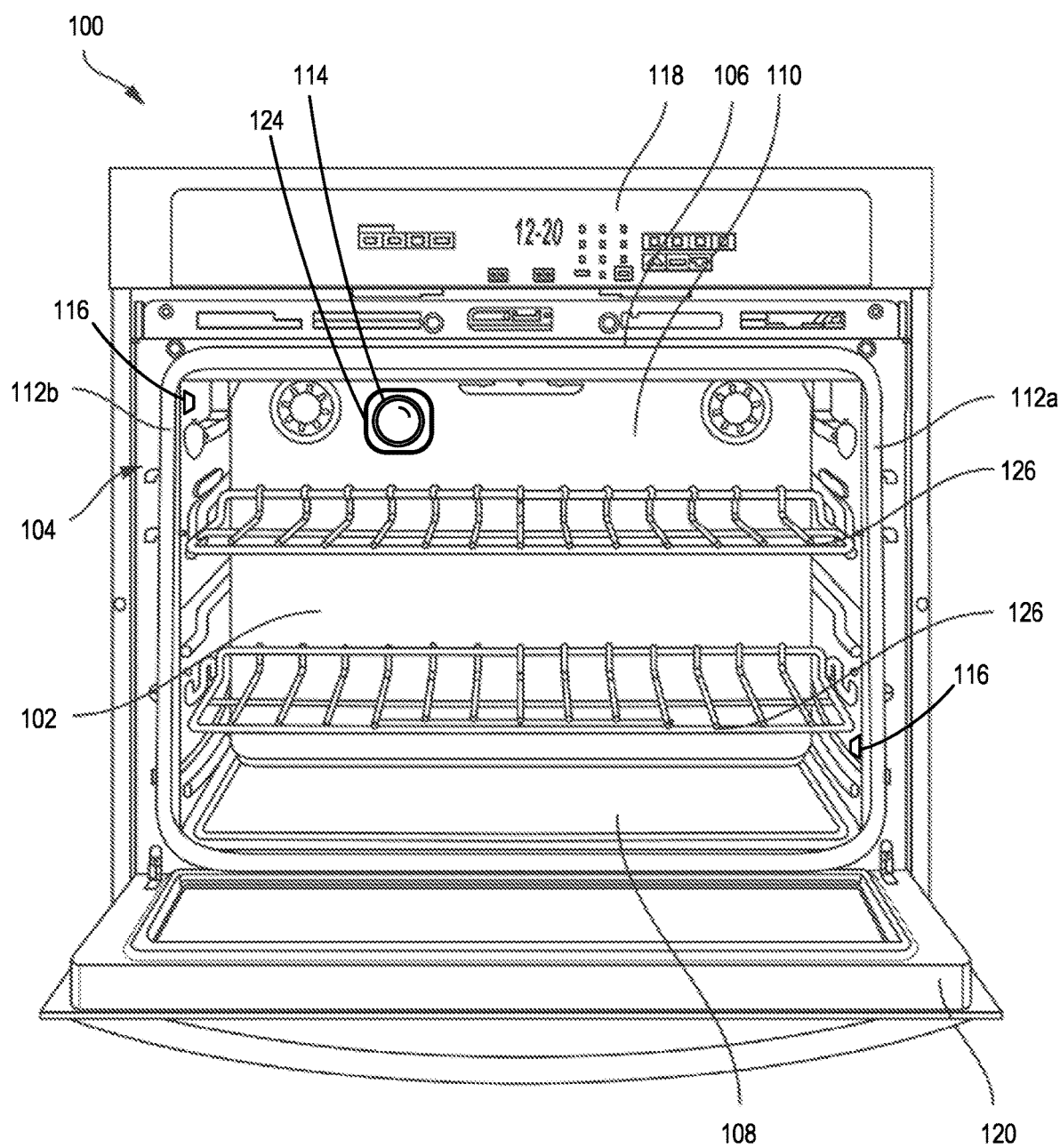
FIG. 1 illustrates an example front perspective view of an oven configured to perform a dedicated self-cleaning cycle for a camera of the oven.

FIG. 1 illustrates an example front perspective view of an oven 100 configured to perform a dedicated self-cleaning cycle for a camera 114 of the oven 100. The oven 100 may be one of various cooking appliances, such as a conventional oven, a convection oven, a conduction oven, a microwave oven, a toaster oven. In some examples, the oven 100 may be a function-specific oven, such as a roaster oven, a pizza oven, etc. The oven 100 may be standalone in some cases, while in other cases the oven may be built-in or a component of a combination oven and stove top.

The oven 100 may form a cabinet 104 and define a cavity 102 having a cavity top 106, cavity bottom 108, cavity back 110, and side walls 112. A door assembly 120 may be hinged at a front of the cavity bottom 108 to permit access to the cavity 102. The door assembly 120 may include a window and a handle and may hermetically seal the cavity when the door is in a closed position. It should be noted that this is an example, and ovens 100 with different types of doors may be used. For instance, a door may be hinged at a side instead of the bottom. A door sensor may be arranged on the door or the cavity 102 to detect an open and closed position of the door of the door assembly 120.

The cavity 102 may be configured to receive food items for cooking, baking, and/or broiling during a cooking cycle. A camera 114 may be arranged within the cavity 102 and be configured to capture images of the contents of the cavity 102. The camera 114 may be located at any of various locations within the cavity 102. As shown, the camera 114 is located on the cavity back 110. However, in other examples, the camera 114 may be located on a side wall 112, on the cavity top 106, or even on the cavity bottom 106. It should also be noted that while a single camera is shown in FIG. 1, in other examples the cavity 102 may include multiple cameras 114 at various locations along the cavity top 106, cavity bottom 108, cavity back 110, side walls 112, and/or the door assembly 120.

The cavity 102 may also include temperature sensors 116 for determining the air temperature within the cavity 102 during cooking. The oven 100 may further include a user interface 118 configured to receive user input with respect to cycles or other oven operation. The user interface 118 may also provide information to the user such as cook time, temperature, etc.

The oven 100 may include a heating system 122 for heating the cavity 102 during cooking. The heating system 122 may include one or more heating elements, such as a gas heating element or an electric heating element. In one example, the heating system 122 may include a first heating element at the bottom of the cavity 102, and a second heating element at the top of the cavity 102. In yet a further example, heating elements may be arranged between the cabinet 104 and the cavity back 110 and/or the cavity top 106. As discussed in further detail herein, the heating system 122 may further include a camera viewport heating element 124 for ensuring the camera 114 view is unobstructed. The oven 100 may include one or more racks 126 within the cavity 102 for supporting the food items during cooking. As shown by way of example in FIG. 1, the oven includes top and bottom rack 126, ovens 100 with more or fewer racks 126 are possible.

Figure 2:
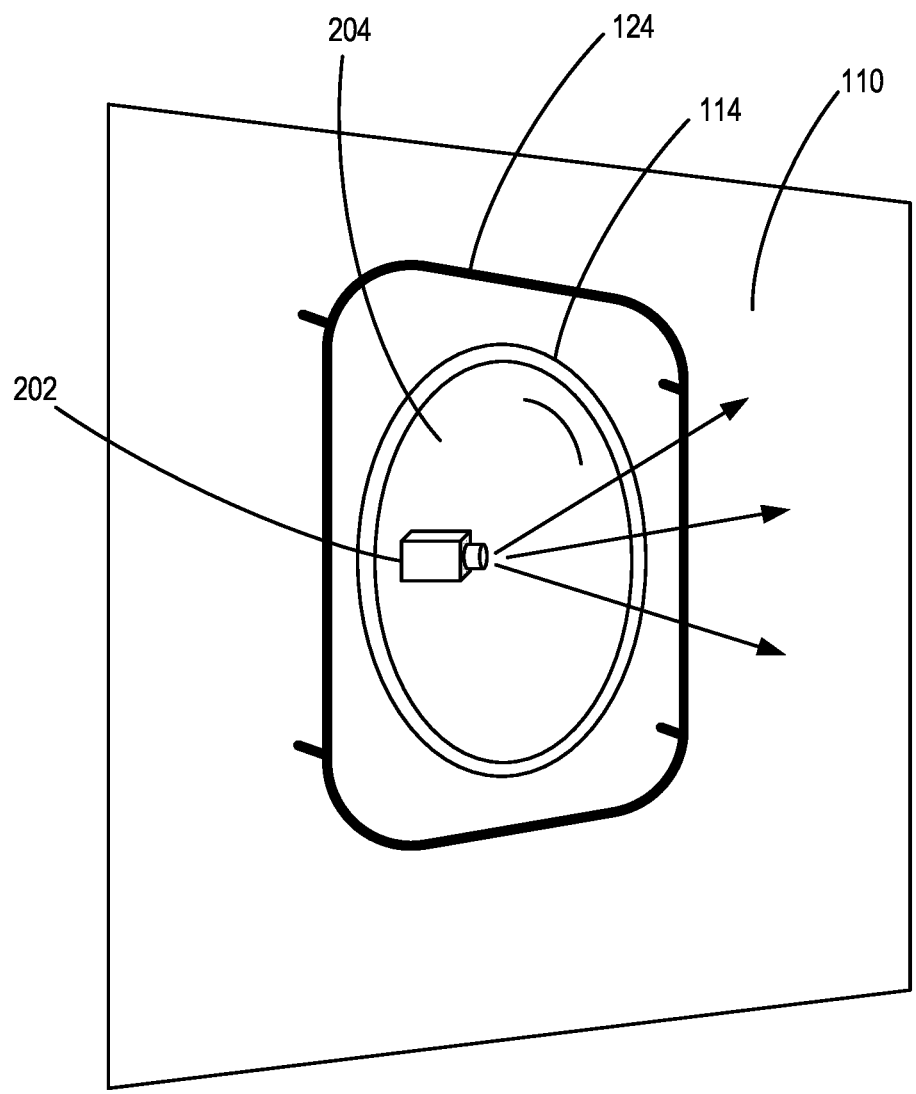
FIG. 2 illustrates further details of the camera and the camera viewport heating element.

FIG. 2 illustrates further details 200 of the camera 114 and the camera viewport heating element 124. As shown, the camera 114 includes an image sensor 202 located behind a view port glass 204. The camera viewport heating element 124 may be located within the cavity 102 of the oven 100. Continuing with the example of the camera 114 being located on the cavity back 110, the camera viewport heating element 124 is shown mounted to the cavity back 110 in front of the view port glass 204. It should be noted, however, that other positions of the camera 114 and camera viewport heating element 124 may be used, such as one or more cameras 114 and corresponding camera viewport heating elements 124 located along the cavity top 106, cavity bottom 108, cavity back 110, side walls 112, and/or the door assembly 120.

The image sensor 202 may be any of various types of sensors configured to generate signals based on the detection of light waves. The image sensor 202 may be a complementary metal-oxide-semiconductor (CMOS) device or a charge-coupled device (CCD), as some non-limiting examples. In some implementations the image sensor 202 may be a red-green-blue (RGB) sensor configured to generate color image data. As another possibility, the image sensor 202 may be a grayscale sensor configured to generate a grayscale visible spectrum image. In yet a further example, the image sensor 202 may be configured to generate an infrared spectrum image. It should be noted that these are merely examples, and image sensors 202 providing different formats of images or detecting different frequencies of light may be used.

The view port glass 204 may be configured to protect the image sensor 202 from heat or residue from the cavity 102 but also pass light waves from the cavity 102 to the image sensor 202. The view port glass 204 may be a material transparent at least to the wavelengths to be captured by the image sensor 202, such as a glass, quartz, plastic, or other material.

The camera viewport heating element 124 may be an electric or resistive heating element in an example, mounted to the cavity back 110 in close proximity to the view port glass 204. As shown in the illustrated example, the camera viewport heating element 124 surrounds the view port glass 204 without obstructing the view of the image sensor 202 into the cavity 102. The camera viewport heating element 124 may be placed to provide localized heating to the view port glass 204, to generate a pyrolytic cycle to clean the view port glass. It should be noted that this is only one example, and different types of camera viewport heating element 124 may be used. For instance, the camera viewport heating element 124 may be integrated with the view port glass 204 such as via resistance wire embedded in the camera viewport heating element 124 itself. Or, the camera viewport heating element 124 may be a gas heating element in another example.

Figure 3:
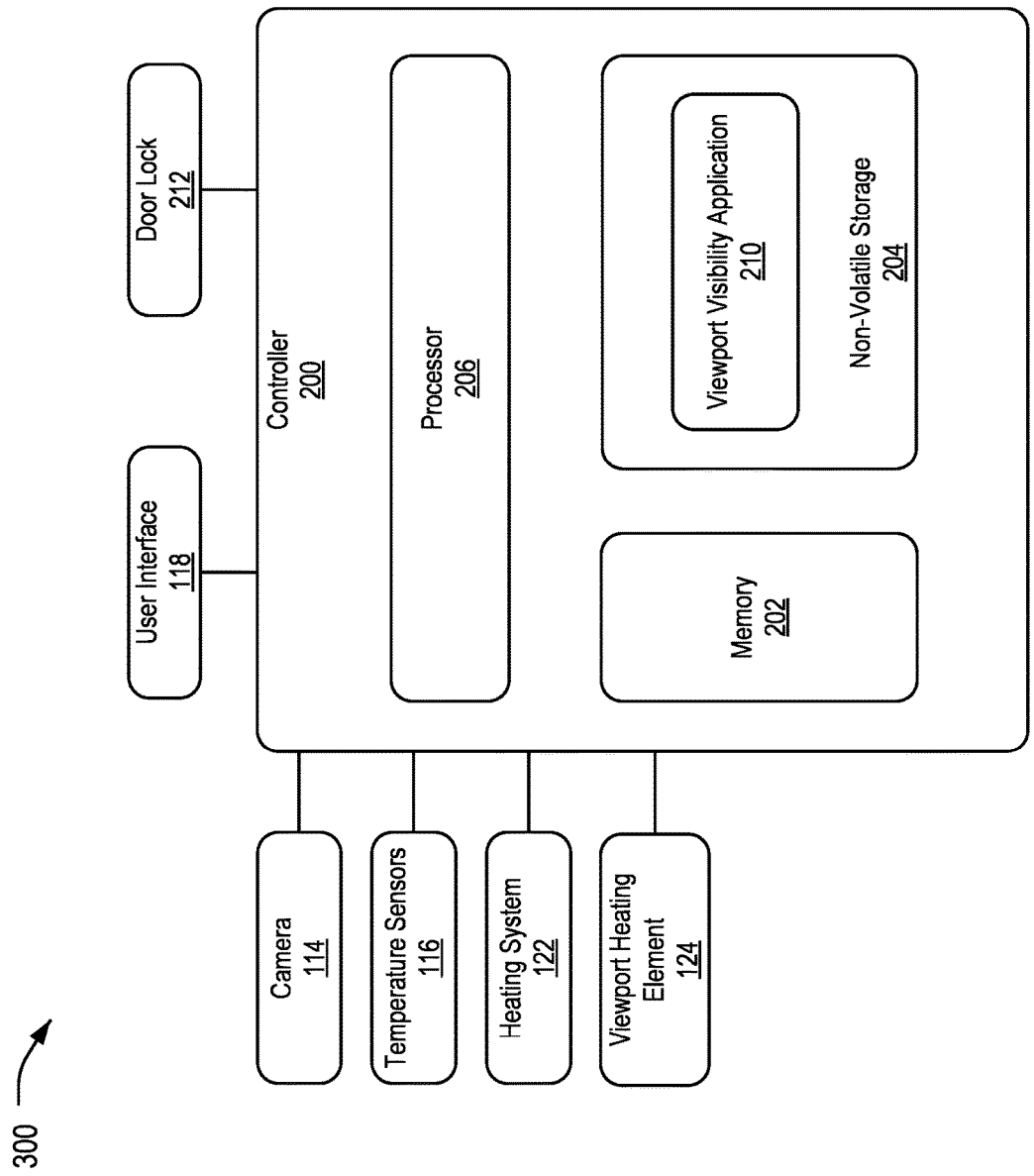
FIG. 3 illustrates an example controller configured to operate the components of the oven to perform camera view port dedicated self-cleaning cycles.

FIG. 3 illustrates an example controller 300 configured to operate the components of the oven 100 to perform camera view port dedicated self-cleaning cycles. The controller 300 may include a memory 302, a non-volatile storage 304, and a processor 306. The non-volatile storage 304 may store operations for a viewport visibility application 310.

The memory 302 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 304 may include one or more persistent data storage devices such as a hard drive, optical drive, tape drive, non-volatile solid-state device, cloud storage or any other device capable of persistently storing information.

The processor 306 may include one or more microprocessors, micro-controllers, digital signal processors, microcomputers, central processing units (CPU), graphical processing units (GPU), tensor processing units (TPU), field programmable gate arrays, programmable logic devices, state machines, logic circuits, analog circuits, digital circuits, or any other devices that manipulate signals (analog or digital) based on computer-executable instructions residing in memory 302.

The processor 306 may be configured to read into memory 302 and execute computer-executable instructions residing in the non-volatile storage 304, such as those of the viewport visibility application 310. Upon execution by the processor 306, the computer-executable instructions may cause the oven 100 to implement one or more of the algorithms and/or methodologies disclosed herein.

The controller 300 may be electrically connected to signaling interfaces of other components of the oven 100, thereby allowing the processor 306 of the controller 300 to manipulate the functions of the oven 100. For example, the controller 300 may be configured to receive user input from the user interface 118, such as requests to initiate a cooking cycle. The controller 300 may also be configured to control operation of the heating system 122, including to apply power to heating elements of the heating system 122 to warm the cavity 102, as well as to discontinue applying power to the heating element of the heating system 122. The controller 300 may also control a door lock 312 to selectively control the latch mechanism of the door assembly 120 to prevent the door assembly 120 from being opened during a cycle.

The controller 300 may also be configured to receive input from other sensors to support the operation of the viewport visibility application 310. This may include input from sensors such as the camera 114 itself and the temperature sensors 116. The controller 300 may also be configured to control operation of the camera viewport heating element 124, including to apply power to the camera viewport heating element 124 perform a pyrolytic cycle for the view port glass 204.

Figure 4:
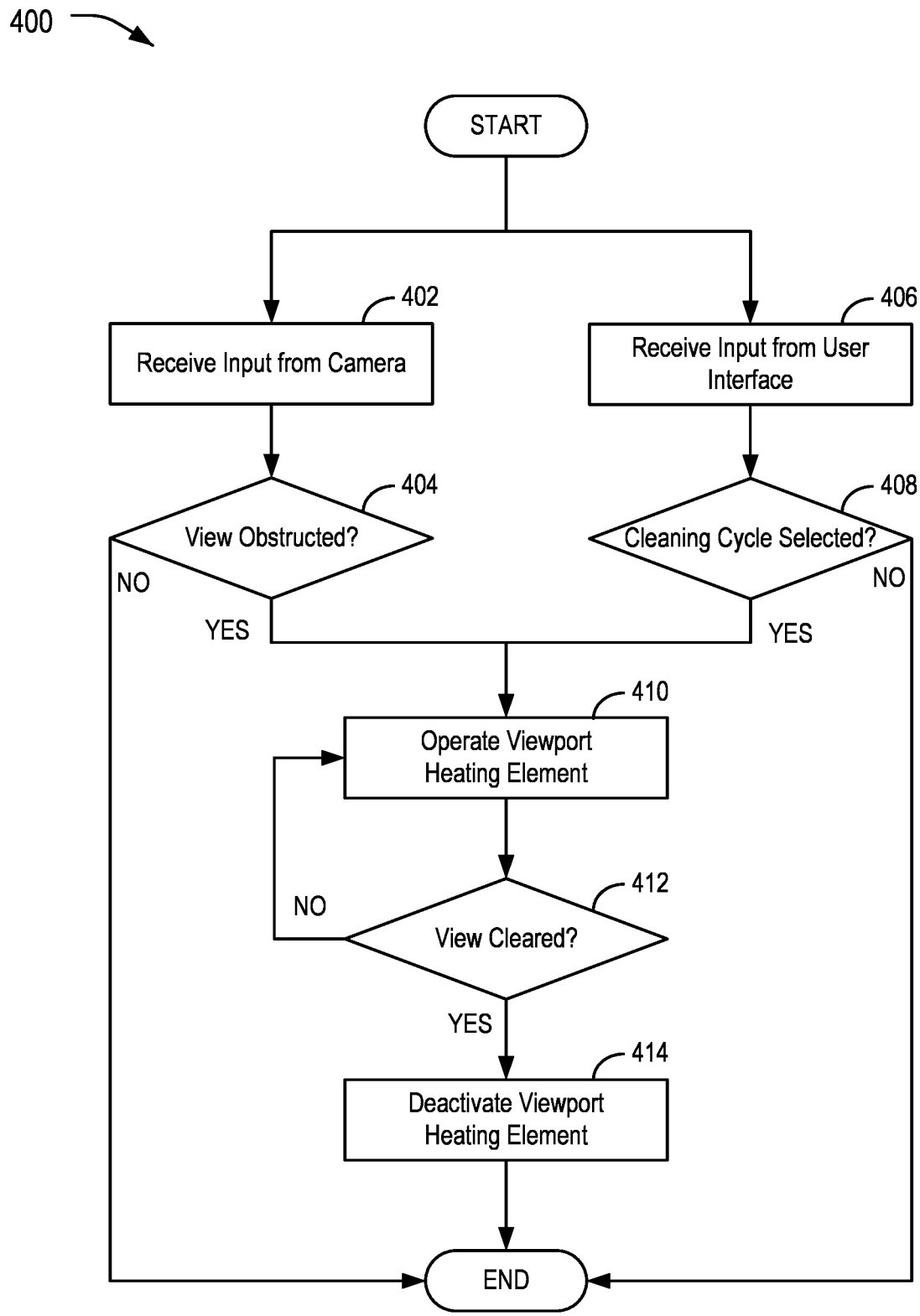
FIG. 4 illustrates an example process for the operation of the oven to perform a pyrolytic cycle to clean the view port glass.

FIG. 4 illustrates an example process 400 for the operation of the oven 100 to perform a pyrolytic cycle to clean the view port glass 204. In an example, the process 400 may be performed under the command of the controller 300.

At operation 402, the controller 300 receives input from the camera 114. In an example the controller 300 may receive a view of the cavity 102 from the image sensor 202 view through the view port glass 204.

At operation 404, the controller 300 determines whether the view of the image sensor 202 is obstructed. In an example, when the cavity 102 is empty, the controller 300 may compare the image captured from the image sensor 202 with a reference image of the empty cavity 102 with a clear view port glass 204. If the differences between these images are greater than a threshold amount (e.g., in count of pixels that differ), then the controller 300 may determine that the view port glass 204 is dirty. In another example, the controller 300 may utilize a machine learning model configured to identify whether the image captured from the image sensor 202 includes grease or other obstructions of the view of the cavity 102. The model may have been trained with a labeled set of images of cavities 102 that have obstructed view port glass 204 and clear view port glass 204. Then the model may be used to infer whether the current image from the image sensor 202 is of an obstructed or clear view port glass 204. Regardless of the approach, if the controller 300 determines that view port glass 204 is dirty, control passes to operation 410. Otherwise, the process 400 ends.

At operation 406, the controller 300 receives input from the user interface 118. In an example, independent of operations 402-404, the controller 300 may receive input to the user interface 118 requesting a pyrolytic cycle. If input is received, at operation 408, the controller 300 determines whether a cleaning cycle is selected. If so, control passes to operation 410. If not, then the process 400 ends.

At operation 410, the controller 300 operates the camera viewport heating element 124. In an example, the controller 300 applies power to the camera viewport heating element 124 to provide heating to the view port glass 204. As the camera viewport heating element 124 is local to the camera 114, far less energy is required to perform the pyrolytic cycle to clear the view port glass 204 as compared to a full pyrolytic cycle of the entire cavity 102 of the oven 100 using the heating system 122.

At operation 412, the controller 300 determines whether the view port glass 204 is cleared. In an example, the controller 300 may operate the camera viewport heating element 124 for a predefined time period, such as ten minutes, thirty minutes, etc. In another example, the controller 300 may periodically perform the operations of operation 404 until the view from the camera 114 is no longer obstructed. If the view port glass 204 is cleared, control passes to operation 414. If not, control returns to operation 410 to continue the pyrolytic cycle.

At operation 414, the controller 300 deactivates the camera viewport heating element 124. Thus, the camera 114 is now once again available for unobstructed use. After operation 414, the process 400 ends.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for a dedicated self-cleaning cycle for a camera for imaging a cavity of an oven, comprising:

receiving a current image of the cavity from an image sensor of the camera;

using the current image to determine whether a view port glass protecting the image sensor of the camera from heat or detritus in the cavity of the oven requires cleaning to ensure visibility from the camera;

responsive to the current image indicating the view port glass requires cleaning, providing an indication to perform a localized pyrolytic cycle to clean the view port glass to ensure the camera has a clear view through the view port glass for operation of functions that require images from the camera;

responsive to the indication, operating a camera viewport heating element configured to provide localized heating to the view port glass to perform the localized pyrolytic cycle and refrain from using a main heating element to perform the full oven pyrolytic cycle; and utilizing the camera to view the cavity of the oven.

2. The method of claim 1, further comprising:

comparing the current image with a reference image of the cavity corresponding to a clean viewport glass to determine whether the view port glass is dirty and requires cleaning to ensure visibility from the camera, the comparing including counting pixels that differ between the current image and the reference image; and providing the indication to perform the localized pyrolytic cycle responsive to the counted pixels that differ being greater than a threshold amount, to ensure the camera has a clear view through the view port glass for operation of functions that require images from the camera.

3. The method of claim 2, further comprising:

periodically receiving further images of the cavity from the image sensor of the camera and comparing the further images with the reference image to determine whether the view port glass is dirty; and completing the localized pyrolytic cycle by deactivating the camera viewport heating element responsive to the comparing indicating that at least one of the further images indicating that the view port glass is clean.

4. The method of claim 1, further comprising:

receiving a current image of the cavity from the image sensor of the camera;

utilizing a machine learning model to infer whether the current image corresponding to a clean viewport glass or a dirty viewport glass; and providing the indication to perform the localized pyrolytic cycle responsive to the machine learning model indicating the view port glass is dirty.

5. The method of claim 4, further comprising training the machine learning model using a dataset of images of oven cavities that have clean viewport glass and images of oven cavities that have dirty viewport glass.

6. The method of claim 4, further comprising:

periodically receiving further images of the cavity from the image sensor of the camera; and completing the localized pyrolytic cycle by deactivating the camera viewport heating element responsive to the machine learning model indicating that at least one of the further images indicating that the view port glass is clean.

7. The method of claim 1, wherein the camera viewport heating element is mounted in the cavity surrounding the view port glass, without obstructing a view of the image sensor into the cavity.

8. A system for performing a dedicated self-cleaning cycle for a camera configured to image a cavity of an oven, comprising:

a camera including an image sensor and a view port glass configured to protect the image sensor of the camera from heat or detritus in the cavity of the oven;

a camera viewport heating element configured to provide localized heating to the view port glass of the camera;

a main heating element configured to perform a full oven pyrolytic cycle; and a controller programmed to receive a current image of the cavity from the image sensor of the camera, use the current image to determine whether the view port glass requires cleaning to ensure visibility of the cavity by the image sensor of the camera, responsive to the current image indicating the view port glass requires cleaning, provide an indication to perform a localized pyrolytic cycle to clean the view port glass to ensure the camera has a clear view through the view port glass for operation of functions that require images from the camera, responsive to the indication, operate the camera viewport heating element to perform the localized pyrolytic cycle and refrain from using the main heating element to perform the full oven pyrolytic cycle, and utilize the camera to view the cavity of the oven.

9. The system of claim 8, wherein the controller is further programmed to:

compare the current image with a reference image of the cavity corresponding to a clean viewport glass to determine whether the view port glass is dirty and requires cleaning to ensure visibility from the camera, the compare including counting pixels that differ between the current image and the reference image; and provide the indication to perform the localized pyrolytic cycle responsive to the counted pixels that differ being greater than a threshold amount, to ensure the camera has a clear view through the view port glass for operation of functions that require images from the camera.

10. The system of claim 9, wherein the controller is further programmed to:

periodically receive further images of the cavity from the image sensor of the camera and comparing the further images with the reference image to determine whether the view port glass is dirty; and complete the localized pyrolytic cycle by deactivating the camera viewport heating element responsive to the comparing indicating that at least one of the further images indicating that the view port glass is clean.

11. The system of claim 8, wherein the controller is further programmed to:

receive a current image of the cavity from the image sensor of the camera;

utilize a machine learning model to infer whether the current image corresponding to a clean viewport glass or a dirty viewport glass; and provide the indication to perform the localized pyrolytic cycle responsive to the machine learning model indicating the view port glass is dirty.

12. The system of claim 11, wherein the controller is further programmed to train the machine learning model using a dataset of images of oven cavities that have clean viewport glass and images of oven cavities that have dirty viewport glass.

13. The system of claim 11, wherein the controller is further programmed to:

periodically receive further images of the cavity from the image sensor of the camera; and complete the localized pyrolytic cycle by deactivating the camera viewport heating element responsive to the machine learning model indicating that at least one of the further images indicating that the view port glass is clean.

14. The system of claim 8, wherein the camera viewport heating element is mounted in the cavity surrounding the view port glass, without obstructing a view of the image sensor into the cavity.

15. A non-transitory computer-readable medium comprising instructions for performing a dedicated self-cleaning cycle for a camera configured to image a cavity of an oven that, when executed by a controller, cause the controller to perform operations including to:
- receive a current image of the cavity from an image sensor of the camera;
- use the current image to determine whether a view port glass protecting the image sensor of the camera from heat or detritus in the cavity of the oven requires cleaning to ensure visibility of the cavity by the image sensor of the camera;
- responsive to the current image indicating the view port glass requires cleaning, provide an indication to perform a localized pyrolytic cycle to clean the view port glass to ensure the camera has a clear view through the view port glass for operation of functions that require images from the camera,
- responsive to the indication, operate a camera viewport heating element configured to provide localized heating to the view port glass to perform the localized pyrolytic cycle and refrain from using the main heating element to perform the full oven pyrolytic cycle; and
- utilize the camera to view the cavity of the oven.

16. The medium of claim 15, further comprising instructions that when executed by the controller, cause the controller to perform operations including to:
- compare the current image with a reference image of the cavity corresponding to a clean viewport glass to determine whether the view port glass is dirty and requires cleaning to ensure visibility from the camera, the compare including counting pixels that differ between the current image and the reference image; and
- provide the indication to perform the localized pyrolytic cycle responsive to the counted pixels that differ being greater than a threshold amount, to ensure the camera has a clear view through the view port glass for operation of functions that require images from the camera.

17. The medium of claim 16, further comprising instructions that when executed by the controller, cause the controller to perform operations including to:
- periodically receive further images of the cavity from the image sensor of the camera and comparing the further images with the reference image to determine whether the view port glass is dirty; and
- complete the localized pyrolytic cycle by deactivating the camera viewport heating element responsive to the comparing indicating that at least one of the further images indicating that the view port glass is clean.

18. The medium of claim 15, further comprising instructions that when executed by the controller, cause the controller to perform operations including to:
- receive a current image of the cavity from the image sensor of the camera;
- utilize a machine learning model to infer whether the current image corresponding to a clean viewport glass or a dirty viewport glass; and
- provide the indication to perform the localized pyrolytic cycle responsive to the machine learning model indicating the view port glass is dirty.

19. The medium of claim 18, further comprising instructions that when executed by the controller, cause the controller to perform operations including to train the machine learning model using a dataset of images of oven cavities that have clean viewport glass and images of oven cavities that have dirty viewport glass.

20. The medium of claim 18, further comprising instructions that when executed by the controller, cause the controller to perform operations including to:
- periodically receive further images of the cavity from the image sensor of the camera; and
- complete the localized pyrolytic cycle by deactivating the camera viewport heating element responsive to the machine learning model indicating that at least one of the further images indicating that the view port glass is clean.

* * * * *